Aug. 3, 1926.
C. E. DULLIGAN
AUTOMATIC FEED DEVICE
Filed Jan. 29, 1924
1,594,821
2 Sheets—Sheet 1
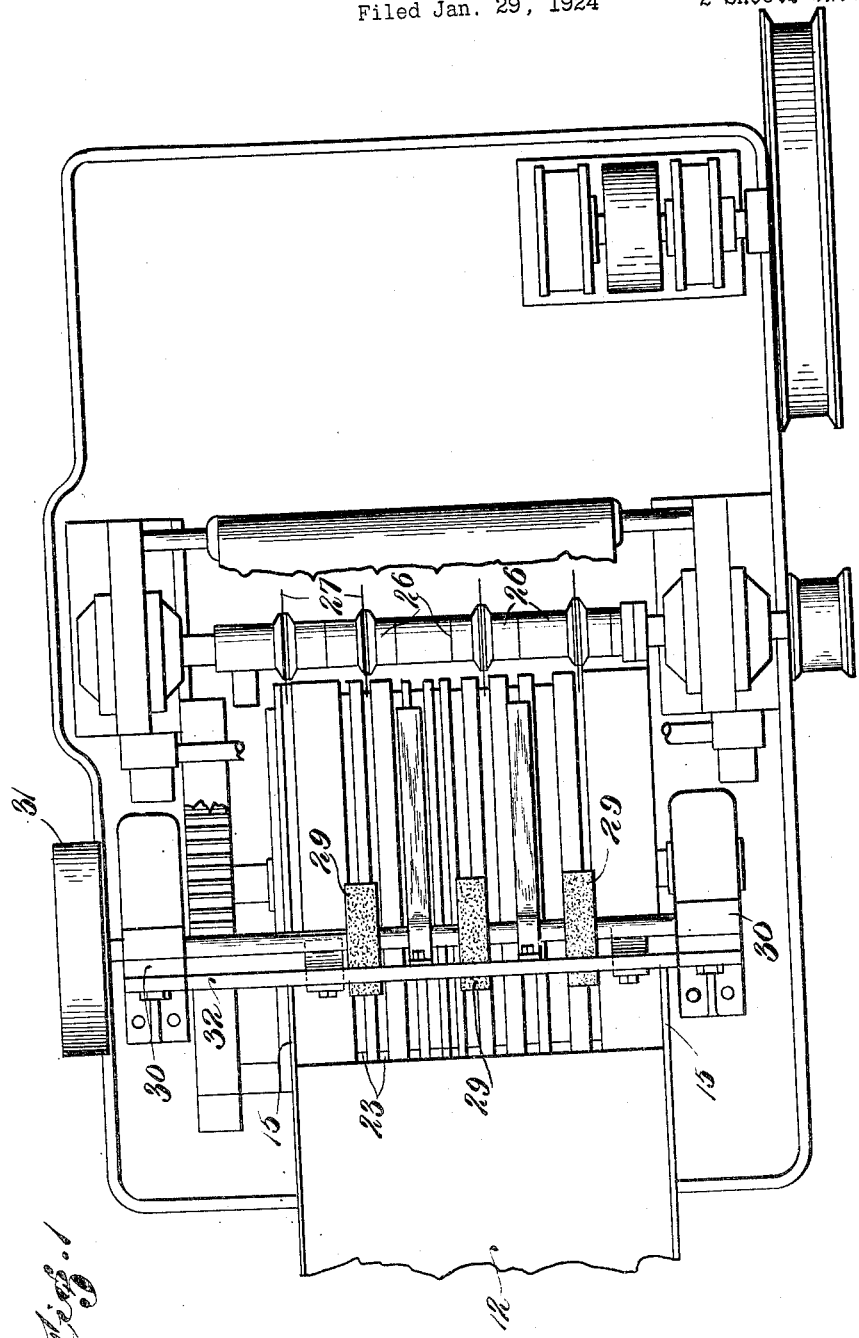

Aug. 3, 1926. 1,594,821
C. E. DULLIGAN
AUTOMATIC FEED DEVICE
Filed Jan. 29, 1924 2 Sheets-Sheet 2
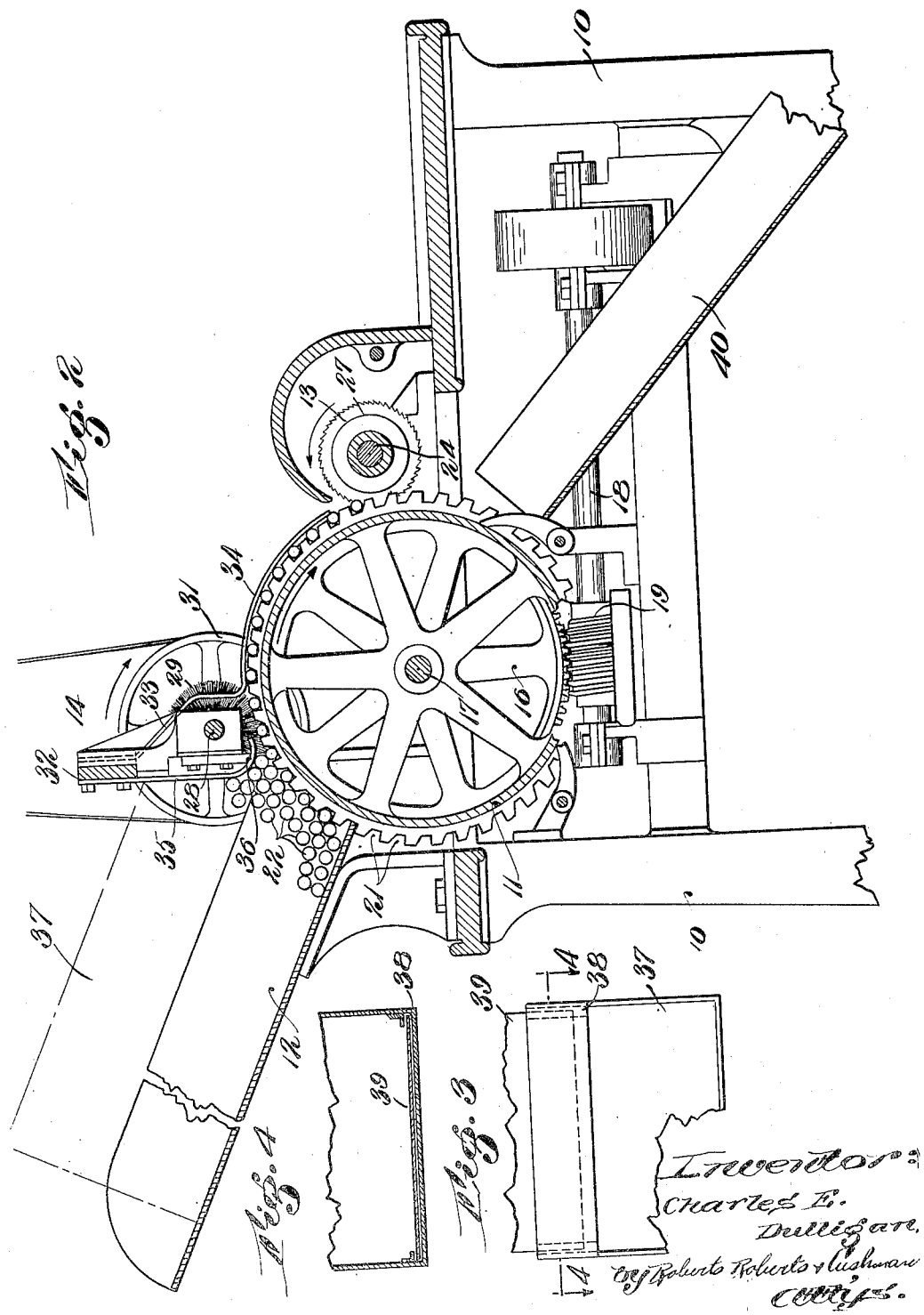

Patented Aug. 3, 1926.

1,594,821

UNITED STATES PATENT OFFICE.

CHARLES E. DULLIGAN, OF LOWELL, MASSACHUSETTS, ASSIGNOR TO UNITED STATES CARTRIDGE CO., OF LOWELL, MASSACHUSETTS, A CORPORATION OF MASSACHUSETTS.

AUTOMATIC FEED DEVICE.

Application filed January 29, 1924. Serial No. 689,261.

This invention relates to a device for the automatic feeding and conveying of material (especially articles which are relatively light in weight and of fragile construction) from a bulk supply, in a controlled and uniform stream, to a desired point.

In conducting various mechanical operations upon materials, such as small objects which must be individually and carefully handled, it frequently becomes necessary to extract them from a more or less unassorted supply, to arrange them in orderly sequence, and to pass them in succession through one or more operations. In such cases they must first be continually withdrawn, without confusion of the remaining supply, and positioned in a fixed and uniform relationship to each other. It is also necessary to prevent jamming at the inlet, and subsequent displacement in transfer or during the operation to be carried out upon them.

It is therefore an object of this invention to provide a feed device which will effect the regulated withdrawal of a succession of articles from an unassorted supply, which will prevent simultaneous withdrawal of more than a fixed amount or number of the articles, repelling the surplus and which will convey the articles withdrawn in fixed relative positions, to the point or points desired. Further objects will appear from the following description of a typical application of my invention and the appended claims.

In general, my invention consists in a bulk supply, a conveyor adjacent thereto, means for directing a uniform charge from the supply to the conveyor, means for removing a surplus therefrom and means for retaining the articles in fixed position on the conveyor. More in detail, the invention is directed to a gravity supply of articles. a rotary drum conveyor which may have pockets in its outer surface, resilient means adapted to distribute the articles over the surface of the drum and into said pockets, and to repel any surplus thereof, and a guard for retaining the articles so distributed in their respective pockets during a predetermined rotation of the drum. The invention is adapted to numerous purposes, but is especially suitable with articles which are light in weight and relatively fragile, and for processes in which it is desirable that they be fed successively and continuously.

The invention may, for example, be applied specifically to the feeding of thin metal radiator tubes into a machine (such as described in co-pending application Serial No. 676,761) for cutting them to desired lengths. An adaptation of the present invention to a machine of this sort which is typical of its general application, is illustrated by the accompanying drawings, wherein:—

Fig. 1 is a plan view of the machine;
Fig. 2 is a side elevation and section of the same;
Fig. 3 is a vertical end view of the supply box; and
Fig. 4 is a plan view of the same along line 4—4 of Fig. 3.

The machine illustrated in Fig. 2 consists of a framework or standard 10 upon which are mounted a rotary feeding conveyor or drum 11, a supply chute 12 adjacent one side of the conveyor, a circular saw 13 and outlet 40 adjacent the other side of the conveyor and an assorting or distributing device 14 intermediate the supply chute and the top of the conveyor.

The conveyor 11 consists of a substantially cylindrical drum carried between two hubs 16, mounted on shaft 17 and operably connected with a driving shaft 18 through the worm gear 19, for rotation in the direction of the arrow.

Lateral guides 15 from the chute 12 extend into close juxtaposition with the periphery of each end of the drum (Fig. 1) and direct a supply of tubes 22 from the chute against the face of the drum (Fig. 2).

The size and shape of the conveyor surface will be modified to conform to the particular service for which it is to be used and may be simply a cylindrical sheet. In some instances it will be desirable to roughen or corrugate the surface, while in others it may be necessary to provide pockets of suitable size and depth. In the present form of the invention the peripheral surface of the drum is provided with longitudinal grooves 21 of suitable contour and depth to receive the tubes 22. A plurality of annular slots 23, of greater depth than the grooves 21, are also provided.

On the opposite side of the conveyor and parallel therewith is mounted a shaft 24, operated by rotation of the driving shaft 18, upon which are mounted at spaced intervals, by means of collars 26, a plurality of metal cutting circular saws 27, which pass into the slots 23 to a point below the bottom of grooves 21.

The assorting or distributing device 14 is mounted above the chute 12 and preferably somewhat in advance of the topmost portion of conveyor 11, and comprises a horizontal shaft 28 which carries a series of stiff but resilient members spaced apart thereon such as the circular brushes 29, and is rotated in bearings 30 on frame 10, by means of a pulley 31.

These resilient members hereinafter referred to as brushes, may vary in form and construction depending upon the environment in which they are used but it has been found that fiber or bristle brushes have a peculiar capacity for the purpose and are readily obtained of the particular size, shape, and degree of resiliency desired. The bristles may be mounted radially of the shaft as shown or at a different angle thereto, as determined by the characteristics of the articles to be distributed, or by the sweeping motion which it is desired to give to them.

Intermediate the brushes 29 and supported by a cross bar 32 are fastened strips 33, extending downward to a point rearwardly of the brushes 29 and slightly above the tubes 22 in grooves 21, and having their ends 34 curved thence to a position substantially parallel to the surface of the drum. These strips serve as guards to prevent displacement of tubes 22 from grooves 21, through a predetermined angle or distance of rotation. Other strips 35 are fastened at the ends of cross bar 32 which pass downward nearly to the surface of the conveyor 11 and have curved portions 36 which extend rearwardly toward the brush 29, and substantially parallel to the conveyor.

For delivering tubes to the supply chute 12, boxes 37 are used as shown in Figs. 3 and 4, having one end open and provided with slots 38 to receive a drop slide 39.

From the above description, the operation of the device will be readily understood. The box 37 is filled with thin metal tubes, lying parallel to its slide, and placed in the chute with the end having the slide facing toward the conveyor 11. Slide 39 is then raised and the tubes roll against the conveyor as shown in Fig. 2, some of them dropping into the grooves 21.

The conveyor may be already in motion. If not, it is caused to rotate together with the brush 29 and saws 27, each perferably in the direction of the adjacent arrow. The tendency of the surplus tubes to pile or roll up upon the conveyor is overcome by the guide strips 35 while those which fit into the grooves 21 are carried by the conveyor beneath these strips, unaffected thereby. Tubes which lie upon or between those positioned in the grooves are urged out from between the curved ends 36 of the strips 35 and the conveyor by the constant sweeping action of the brushes 29. The brushes also press the tubes which have been carried past the guides 36 more firmly into the grooves 21 of the conveyor, so that they will pass smoothly beneath the guard strips 34, and be held thereby until they come into contact with the saws 27 which cut them to desired lengths. Upon passing beyond the guard strips 36, they are released and fall into the outlet chute 40.

In cases where the grooves 21 are extremely shallow or are not employed, it may be found desirable to rotate the brushes 29 in the opposite direction, thus urging the tubes which are fed beneath them against the conveyor surface and against those which precede them as they pass under the guard 36. Or, these results may be effected by two brushes oppositely rotated. Other combinations and modifications of the invention may be made, without departing from the spirit and scope of the above disclosure and the following claims, which will adapt it to numerous purposes.

However, for most purposes markedly better results are obtained by rotating the brushes oppositely to the drum and preferably at a peripherial velocity somewhat greater than the peripherial velocity of the drum.

I claim:

1. A feed device for feeding and retaining rigid elongated articles firmly in position during mechanical operations thereon comprising a drum conveyor for carrying the articles thereon, a revolving brush mounted adjacent the surface of the conveyor and adapted positively to arrange and retain the articles in uniform successive order thereon, and guard means for retaining them in arranged position thereon.

2. A feed device for feeding and retaining rigid elongated articles firmly in position during mechanical operations thereon, comprising a revolvable drum having a cylindrical surface, a chute directing a supply of articles against said surface and a revolving brush mounted adjacent to and bearing against the surface of said drum to arrange and retain said articles in successive order against said surface upon rotation of the drum, and guard means for retaining the objects in their relative positions thereon.

3. A feed device for feeding and retaining rigid elongated articles firmly in position during mechanical operations thereon comprising a revolvable drum having a substantially cylindrical surface, a chute directing a supply of the articles against said surface, a resilient guide adjacent the drum, restraining a part of the supply from said surface, and a rotary brush to urge the articles which lie against said surface in the direction of rotation of the drum and in firmly seated position thereon.

4. A feed device for feeding and retaining rigid elongated articles firmly in position during mechanical operations thereon comprising a revolvable drum, article receiving pockets in the outer surface thereof, a chute directing a supply of articles against said surface, and a revolvable brush mounted adjacent said surface to urge said articles upon rotation of the drum, into said pockets and to repel an excess therefrom.

5. A feed device for feeding and retaining rigid elongated articles firmly in position during mechanical operations thereon comprising a revolvable drum, longitudinal grooves in the surface thereof, a chute for directing a supply of articles against said surface, and a cylindrical brush parallel with and adapted to rotate against said drum to urge the articles into said grooves and to repel an excessive charge therefrom.

6. A feed device for feeding and retaining rigid elongated articles firmly in position during mechanical operations thereon comprising a revolvable drum, longitudinal grooves in the surface thereof, a chute for directing a supply of articles against said surface substantially parallel to said grooves, and a guide adjacent said drum deflecting the part of said supply not contained in said grooves away from the drum surface and urging the articles contained in said grooves against the drum.

7. A feed device for feeding and retaining rigid elongated articles firmly in position during mechanical operations thereon comprising a revolvable drum, longitudinal grooves in the surface thereof, a chute for directing a supply of articles against said surface and into said grooves, a guide adjacent said drum, deflecting the portion of said supply not contained in the grooves away from the drum surface, and a rotary brush for repelling said deflected articles and urging the tubes in the grooves more firmly therein.

8. A feed device for feeding and retaining rigid elongated articles firmly in position during mechanical operations thereon comprising a revolvable drum, longitudinal grooves in the surface thereof, a chute for directing a supply of articles against said surface and into said grooves, a guide adjacent said drum, deflecting the portion of said supply not contained in the grooves away from the drum surface, a rotary brush for repelling said deflected portion and urging the articles in the grooves more firmly therein, and a guard parallel to said drum and retaining said articles in the grooves on said drum throughout a predetermined rotation thereof.

9. A feed device for feeding and retaining rigid elongated articles firmly in position during mechanical operations thereon comprising a revolvable drum, having a substantially cylindrical surface, a chute for directing a supply of the articles against said surface, a resilient guide adjacent the drum, restraining a portion of the supply from said surface, a plurality of rotary brushes to repel the articles not in contact with the drum away from said guide, and to urge the articles which lie against said surface in the direction of rotation of the drum and in firmly seated position thereon.

10. A feed device for feeding and retaining rigid elongated articles firmly in position during mechanical operations thereon, comprising a conveyor for carrying articles thereon, a brush mounted adjacent the surface of the conveyor and with its bristles in resilient contact therewith, and means for rotating said brush in opposite direction to the movement of the conveyor to arrange and retain said articles in uniform successive order thereon.

Signed by me at Lowell, Massachusetts, this 21st day of January, 1924.

CHARLES E. DULLIGAN.